(12) United States Patent
Iseki et al.

(10) Patent No.: US 7,339,019 B2
(45) Date of Patent: Mar. 4, 2008

(54) ETHYLENE-α-OLEFIN COPOLYMER

(75) Inventors: Yuki Iseki, Chiba (JP); Katsuhiro Yamada, Ichihara (JP); Tatsuhiro Nagamatsu, Chiba (JP)

(73) Assignee: Sumitomo Chemical Company, Ltd., Chou-ku, Tokyo (JP)

( * ) Notice: Subject to any disclaimer, the term of this patent is extended or adjusted under 35 U.S.C. 154(b) by 0 days.

(21) Appl. No.: 11/255,866

(22) Filed: Oct. 24, 2005

(65) Prior Publication Data
US 2006/0089475 A1    Apr. 27, 2006

(30) Foreign Application Priority Data

Oct. 26, 2004 (JP) .............................. 2004-310670
Mar. 28, 2005 (JP) .............................. 2005-091266
Sep. 29, 2005 (JP) .............................. 2005-283891

(51) Int. Cl.
*C08F 210/16*  (2006.01)
*C08F 210/00*  (2006.01)
*C08G 61/02*  (2006.01)

(52) U.S. Cl. ................. 526/348; 526/348.2; 526/348.3; 526/348.4; 526/348.5; 526/348.6; 526/352.2; 528/396

(58) Field of Classification Search ................. 526/348, 526/348.6, 348.2, 351, 352, 352.2, 142, 116; 528/396
See application file for complete search history.

(56) References Cited

U.S. PATENT DOCUMENTS

| 5,374,700 | A |  | 12/1994 | Tsutsui et al. |
| 6,586,356 | B2 | * | 7/2003 | Takaoki et al. .............. 502/155 |
| 6,867,277 | B2 | * | 3/2005 | Iseki ........................ 526/348.3 |
| 7,125,946 | B2 | * | 10/2006 | Iseki et al. ................ 526/348.6 |
| 7,141,639 | B2 | * | 11/2006 | Iseki et al. .................. 526/352 |
| 2004/0030082 | A1 |  | 2/2004 | Iseki |
| 2005/0098927 | A1 | * | 5/2005 | Iseki et al. .................. 264/464 |
| 2005/0192417 | A1 |  | 9/2005 | Iseki et al. |

FOREIGN PATENT DOCUMENTS

DE    103 39 987 A1    3/2004

* cited by examiner

*Primary Examiner*—David W. Wu
*Assistant Examiner*—Rip A. Lee
(74) *Attorney, Agent, or Firm*—Fitch Even Tabin & Flannery

(57) ABSTRACT

A copolymer having monomer units derived from ethylene and monomer units derived from an α-olefin of 3 to 20 carbon atoms, a density of 906 to 970 kg/m$^3$ and an activation energy of flow of 50 kJ/mol or more, and satisfying specific relations among a melt complex viscosity, a melt flow rate and a characteristic relaxation time.

5 Claims, No Drawings

ETHYLENE-α-OLEFIN COPOLYMER

This Application is a U.S. Utility patent application which claims priority from Japanese Application No. JP 2004-310670, filed Oct. 26, 2004, Japanese Application No. JP 2005-091266, filed Mar. 28, 2005, and Japanese Application No. JP 2005-283891, filed Sep. 29, 2005, the complete disclosures of which are incorporated herein by reference.

BACKGROUND OF THE INVENTION

1. Field of the Invention

The present invention relates to an ethylene-α-olefin copolymer. More particularly, the present invention relates to an ethylene-α-olefin copolymer providing extrusion-molded articles excellent in moldability, optical properties and appearance.

2. Description of the Related Arts

As films and sheets used for packaging foods, pharmaceuticals, convenience goods and the like, molded articles obtained by extrusion molding of ethylene-α-olefin copolymers are much used. In these ethylene-α-olefin copolymers, excellent moldability is required. For example, there is disclosed an ethylene-1-butene copolymer which is obtained by copolymerizing ethylene and 1-butene with a catalyst formed from a catalyst component produced by reacting bis(indenyl)ethane, n-butyllithium and zirconium tetrachloride, silica, an organoaluminum-oxy compound and tri-isobutylaluminum, and which satisfies a specific relation between a melt tension and a melt flow rate of the copolymer and a specific relation between a temperature of the maximum peak in an endothermic curve of the copolymer measured by a differential scanning calorimeter and a density of the copolymer(e.g. U.S. Pat. No. 5,374,700).

In addition, there is disclosed an ethylene-α-olefin copolymer which is obtained by copolymerizing ethylene and 1-hexene with a catalyst formed from a co-catalyst carrier obtained by contacting diethyl zinc, pentafluorophenol, water and silica, racemi-ethylenebis(1-indenyl)zirconium phenoxide and triisobutylaluminum, and which has a melt flow rate within a specific range and satisfies specific relations between a melt tension and a melt flow rate and between an intrinsic viscosity and a melt flow rate(e.g. US 2004/0030082 A1), and further, another ethylene-α-olefin copolymer which is obtained by copolymerizing ethylene and 1-hexene with a catalyst formed from a co-catalyst carrier obtained by contacting diethyl zinc, pentafluorophenol, water, silica and trimethyldisilazane, racemi-ethylenebis(1-indenyl)zirconium phenoxide and triisobutylaluminum, and which has a melt flow rate within a specific range and satisfies specific relations between a melt tension and a melt flow rate, between a intrinsic viscosity and melt flow rate, and additionally between a chain length of a high polymer component and a melt flowrate(e.g. DE10339987 A1).

However, molded articles obtained by extrusion-molding the above-described ethylene-α-olefin copolymers, were not sufficiently satisfied in optical properties such as transparency and surface gloss, and further, the appearance thereof was sometimes deteriorated by formation of fish eyes.

SUMMARY OF THE INVENTION

An object of the present invention is to provide an ethylene-α-olefin copolymer having a good moldability and providing molded articles excellent in optical properties and appearance.

The present invention (hereinafter, sometimes referred to as "first invention") is to provide an ethylene-α-olefin copolymer having monomer units derived from ethylene and monomer units derived from an α-olefin of 3 to 20 carbon atoms, of a density(d) of 906 to 970 kg/m³, wherein an activation energy(Ea) of flow is 50 kJ/mol or more, a melt complex viscosity(η, unit: Pa·sec) measured at a temperature of 190° C. and angle frequency of 100 radian/second and a melt flow rate (hereinafter, sometimes referred to as "MFR", unit: g/10 minutes.) satisfy a relation of the following formula (1), and an MFR and a characteristic relaxation time(t, unit: second satisfy a relation of the following formula (2):

$$\eta < 1550 \times MFR^{-0.25} - 420 \tag{1}$$

$$2 < t \leq 5.2 \times MFR^{-0.746} \tag{2}$$

Another aspect of the present invention (hereinafter, sometimes referred to as "second invention") relates to an ethylene-α-olefin copolymer having monomer units derived from ethylene and monomer units derived from an α-olefin of from 3 to 20 carbon atoms, and having a density(d) of 906 to 970 kg/m³, wherein an activation energy(Ea) of flow is 50 kJ/mol or more, a melt complex viscosity(η, unit: Pa·sec) measured at a temperature of 190° C. and angle frequency of 100 rad/sec and an MFR satisfy a relation of the following formula (1), and when the density is less than 915 kg/m³, a chain length of the highest molecular weight component(A, unit is angstrom) and an MFR satisfy a relation of the following formula (3) or when the density is not less than 915 kg/m³, those satisfy a relation of the following formula (4):

$$\eta < 1550 \times MFR^{-0.25} - 420 \tag{1}$$

$$3.3 < \log A \leq -0.0815 \times \log(MFR) + 3.96 \tag{3}$$

$$3.3 < \log A \leq -0.0815 \times \log(MFR) + 3.98 \tag{4}$$

DETAILED DESCRIPTION OF THE INVENTION

The ethylene-α-olefin copolymer of the present invention is an ethylene-α-olefin copolymer having monomer units derived from ethylene and monomer units derived from an α-olefin of 3 to 20 carbon atoms.

Examples of the α-olefin having 3 to 20 carbon atoms include propylene, 1-butene, 1-pentene, 1-hexene, 1-heptene, 1-octene, 1-nonene, 1-decene, 1-dodecene, 4-methyl-1-pentene and 4-methyl-1-hexene, and these may be used alone or in combination of 2 or more. 1-hexene and 4-methyl-1-pentene are preferred.

The content of monomer units derived from ethylene is from 50 to 99.5 wt % based on the total weight (100 wt %) of the ethylene-α-olefin copolymer. In addition, the content of the monomer units derived from an α-olefin having 3 to 20 carbon atoms is from 0.5 to 50 wt % based on the total weight (100 wt %) of the ethylene-α-olefin copolymer.

The ethylene-α-olefin copolymer of the present invention may also contain monomer units derived from other monomers than ethylene and α-olefins having 3 to 20 carbon atoms within a range not damaging the effect of the present invention. Examples of other monomers include conjugated dienes (e.g. butadiene, isoprene), non-conjugated dienes (e.g. 1,4-pentadiene), acrylic acid, acrylates (e.g. methyl acrylate, ethyl acrylate), methacrylic acid, methacrylates (e.g. methyl methacrylate, ethyl methacrylate) and vinyl acetate.

The ethylene-α-olefin copolymer of the present invention is preferably a copolymer of ethylene and an α-olefin of 4 to 10 carbon atoms, more preferably a copolymer of ethylene and an α-olefin of 5 to 10 carbon atoms, most preferably a copolymer of ethylene and an α-olefin of 6 to 10 carbon atoms. Examples of the ethylene-α-olefin copolymer include an ethylene-1-hexene copolymer, ethylene-4-methyl-1-pentene copolymer, ethylene-1-octene copolymer, ethylene-1-butene-1-hexene copolymer, ethelene-1-butene-4-methyl-1-pentene copolymer and ethylene-1-butene-1-octene copolymer, preferably an ethylene-1-hexene copolymer, ethylene-1-butene-1-hexene copolymer and ethylene-1-butene-4-methyl-1-pentene copolymer, more preferably an ethylene-1-hexene copolymer and ethylene-1-butene-1-hexene copolymer.

The ethylene-α-olefin copolymer of the present invention has an MFR of usually from 0.01 to 100 g/10 minutes. The MFR is preferably 0.05 g/10 minutes or more from the viewpoint of reduction of a load during extrusion molding, more preferably 0.1 g/10 minutes or more. On the other hand, the MFR is preferably 20 g/10 minutes or less from the viewpoint of improving mechanical strength of the extruded moldings, more preferably 10 g/10 minutes or less, most preferably 6 g/10 minutes or less. The MFR is a value measured under a load of 21.18 N (2.16 Kg) at 190° C. according to A-method in JIS K7210-1995. When the MFR is measured, an ethylene-α-olefin copolymer to which an antioxidant has been previously added in an amount of about 1000 wt-ppm, is used.

The ethylene-α-olefin copolymer has a density of 890 to 970 kg/m$^3$, the density is preferably 906 kg/m$^3$ or more from the viewpoint of improving rigidity of molded articles, more preferably 908 kg/m$^3$ or more. On the other hand, the density is preferably 940 kg/m$^3$ or less from the viewpoint of improving impact strength of molded articles, more preferably 930 kg/m$^3$ or less. The density of the copolymer is measured according to A-method in JIS K7112-1980 after annealed according to JIS K6760-1995.

The ethylene-α-olefin copolymer of the present invention is a one excellent in moldability and like an ethylene-α-olefin copolymer which has a structure having a long chain branching, and the activation energy of flow (Ea; unit is kJ/mol) of such the copolymer is higher than that of ordinary ethylene-α-olefin copolymers conventionally known. The Ea of the ordinary copolymer is lower than 50 kJ/mol, therefore, a sufficient satisfaction could not be sometimes obtained in the mold processability, particularly in the extrusion load.

The Ea of the ethylene-α-olefin copolymer of the present invention is, from the viewpoint of improving moldability, particularly from the viewpoint of reduction of extrusion load without excessive decrease of the melt tension, preferably 55 kJ/mol or more, more preferably 60 kJ/mol or more.

Further, it is preferably 100 kJ/mol or less, more preferably 90 kJ/mol or less from the viewpoint of improving the optical properties of extruded molded articles.

The above-mentioned Ea is a numerical value calculated according to the Arrhenius equation from a shift factor($a_T$) in preparation of a master curve showing the dependency of melt complex viscosity at 190° C. (η; unit is Pa·second) on angular frequency (unit is rad/second) based on the temperature-time superposition theory, and is a value which can be determined by the following method.

Namely, each of curves of the melt complex viscosity-angular frequency of the ethylene-α-olefin copolymer at temperatures (T, unit is ° C.) of 130° C., 150° C., 170° C. and 190° C., respectively is superposed on the curve of the melt complex viscosity-angular frequency of the ethylene-α-olefin copolymer at 190° C. based on the temperature-time superposition theory, to obtain a shift factor($a_T$) at each of the temperatures(T), then a linear approximate equation of [ln($a_T$)] and [1/(T+273.16)] {the following equation (I)} is calculated by least-square method from each of the temperatures and the shift factors at each of the temperatures, respectively. Next, Ea is determined from a slope m of the linear equation and the following equation (II).

$$\ln(a_T)=m(1/(T+273.16))+n \quad (I)$$

$$Ea=|0.008314 \times m| \quad (II)$$

$a_T$: Shift factor
Ea: Activation energy of flow (unit: kJ/mol)
T: Temperature (unit: ° C.)

The above-described equation may be determined using a commercial software for a computer, and as the soft ware, for example, Rhinos V.4.4.4 (manufactured by Rheometrics Limited) can be listed.

Herein, the shift factor ($a_T$) is a shifted amount at which double logarithmic curves of melt complex viscosity-angular frequency at each of the temperatures is shifted to the direction of log(Y)=−log(X) axis (Y axis: melt complex viscosity, X axis: angular frequency) to superimpose on the curve of melt complex viscosity-angular frequency at 190° C., and in the superposition, each of the double logarithmic curves of melt complex viscosity-angular frequency at the respective temperature is shifted $a_T$ times in the angular frequency and 1/$a_T$ times in the melt complex viscosity. Further, the coefficient of correlation is usually 0.99 or more when the equation (I) is determined by a least-square method from values of 4 points of 130° C., 150° C., 170° C. and 190° C.

The measurement of the melt complex viscosity-angular frequency curve is usually carried out using a viscoelasticity measuring apparatus(e.g. Rheometrics Mechanical Spectrometer RMS-800 manufactured by Rheometrics, Limited) under the following conditions:
(1) Geometry; parallel plate,
(2) Diameter of plate; 25 mm,
(3) Distance between plates; 1.5 to 2 mm,
(4) Strain: 5%, and
(5) Angular frequency; 0.1 to 100 rad/second In addition, the measurement is carried out under a nitrogen atmosphere and it is preferable to add previously an antioxidant in a proper amount (e.g. 1000 wt-ppm) to the sample to be measured.

The ethylene-α-olefin copolymer of the present invention is a one which has a structure like an ethylene-α-olefin copolymer which has a structure having a long chain branching, and is excellent in moldability, in which the melt complex viscosity at 190° C. and an angle frequency of 100 rad/second satisfies the relation of the following formula(1):

$$\eta < 1550 \times MFR^{-0.25} - 420 \quad (1)$$

wherein the MFR is a value measured according to A-method defined in JIS K7210-1995, at a temperature of 190° C. under a load of 21.18 N.

Because ordinary ethylene-α-olefin copolymers which have been conventionally known, do not satisfy the relation of the formula (1), sufficient satisfaction in moldability, particularly in a low extrusion load could not be often obtained.

From the viewpoint of heightening of the moldability, the melt complex viscosity(η) at 190° C. and an angle frequency of 100 rad/second of the ethylene-α-olefin copolymer of the present invention satisfies preferably the relation of the following formula(1'), more preferably the relation of the following formula (1"), and most preferably the relation of the following formula (1'''):

$$\eta < 1550 \times MFR^{-0.25} - 420 \tag{1'}$$

$$\eta < 1450 \times MFR^{-0.25} - 420 \tag{1''}$$

$$\eta < 1350 \times MFR^{-0.25} - 420 \tag{1'''}$$

The melt complex viscosity(η) at 190° C. and an angular frequency of 100 rad/second of the ethylene-α-olefin copolymer is a one at an angular frequency of 100 rad/second on the melt complex viscosity at 190° C.-angular frequency curve prepared for calculation of the activation energy of flow(Ea).

The first ethylene-α-olefin copolymer of the present invention is a one in which the long chain length may not be too long and the characteristic relaxation time (t: unit is second) satisfies the following formula(2):

$$2 < t \leq 5.2 \times MFR^{-0.746} \tag{2}$$

wherein the MFR is as defined before.

An ethylene-α-olefin copolymer in which, for example, the length of the long chain branching may be too long, does not usually satisfy the right side of the formula(2). Therefore, the copolymer does not often provide sufficiently satisfactory molded articles in appearance. In addition, ordinary copolymers conventionally known have a characteristic relaxation time of shorter than 2 seconds because they do not have a structure like an ethylene-α-olefin copolymer which has a structure having a long chain branching.

From the viewpoint of improving optical properties, the characteristic relaxation time (t) of the first ethylene-α-olefin copolymer of the present invention satisfies preferably the relation of the following formula (2'), and more preferably the relation of the following formula (2").

$$2 < t \leq 5.1 \times MFR^{-0.746} \tag{2'}$$

$$2 < t \leq 5.0 \times MFR^{-0.746} \tag{2''}$$

The characteristic relaxation time (t) of the ethylene-α-olefin copolymer is a value determined by expressing the master curve of the melt complex viscosity-angular frequency at 190° C. prepared for calculation of the activation energy of flow(Ea) described above as the following approximate equation:

$$\eta = \eta_0 / [1 + (t \times \omega)^n]$$

η; Melt complex viscosity,

ω; Angular frequency (rad/second), $\eta_0$; Constant determined in each ethylene-α-olefin copolymer, n; Constant determined in each ethylene-α-olefin copolymer In addition, the approximation of the above-described master curve to the above-described equation may be determined using a commercial software for a computer, and as the soft ware, for example, Rhinos V.4.4.4 (manufactured by Rheometrics Limited) can be listed.

The second ethylene-α-olefin copolymer of the present invention is an ethylene-α-olefin copolymer having a structure like an ethylene-α-olefin copolymer which has a structure having a long chain branching, and is an ethylene-α-olefin copolymer in which a molecular weight of the highest molecular weight component (described in detail later) is appropriately low and a chain length (A: unit is angstrom) of the highest molecular weight component satisfies the following formula (3) or (4):

when the density is less than 915 kg/m³;

$$3.3 < \log A \leq -0.0815 \times \log(MFR) + 3.96 \tag{3}$$

when the density is not less than 915 kg/m³;

$$3.3 < \log A \leq -0.0815 \times \log(MFR) + 3.98 \tag{4}$$

The measurement method of the MFR is as described before.

The ethylene-α-olefin copolymer having a structure like an ethylene-α-olefin copolymer which has a structure having a long chain branching, in which the molecular weight of the highest molecular weight component is high, usually satisfies the right side of neither the formula (3) nor (4). Therefore, the copolymer can not often provide sufficiently satisfactory molded articles in appearance. In addition, from the viewpoint of improving moldability, it is preferable to satisfy the left side of the formula (3) or (4).

From the viewpoint of improving optical properties, the chain length of the highest molecular weight component of the second ethylene-α-olefin copolymer of the present invention satisfies preferably the relation of the following formula (3') or (4'):

when the density is less than 915 kg/m3;

$$3.3 < \log A \leq -0.0815 \times \log(MFR) + 3.95 \tag{3'}$$

when the density is not less than 915 kg/m³;

$$3.3 < \log A \leq -0.0815 \times \log(MFR) + 3.97 \tag{4'}$$

Further, it is further preferably to satisfy the relation of the following formula (3") or (4"):

when the density is less than 915 kg/m3;

$$3.3 < \log A \leq -0.0815 \times \log(MFR) + 3.94 \tag{3''}$$

when the density is not less than 915 kg/m³;

$$3.3 < \log A \leq -0.0815 \times \log(MFR) + 3.96 \tag{4''}$$

The chain length(A) of the highest molecular weight component of the ethylene-α-olefin copolymer is a chain length at peak position of a logarithm normal distribution curve of a component having the highest molecular weight among four logarithm normal distribution curves obtained by considering a chain length distribution curve obtained by gel permeation chromatography measurement as a composite curve composed of four logarithm normal distribution curves, then by dividing the composite curve into four logarithm normal distribution curves by means of a wave analysis. The chain length of the component having the highest molecular weight can be determined by a method shown below:

(1) The chain length distribution curve, in which a weight ratio dW/d(log Aw) (y value) to log Aw (x value) as a logarithm of molecular chain length Aw is plotted by a gel permeation chromatography method, is prepared. Herein, in the gel permeation chromatography measurement, a standard polystyrene is used and the molecular weight of the standard polystyrene is converted into a molecular chain length by the following equation:

Molecular chain length(unit:angstrom)=Molecular weight of standard polystyrene/40.9

(2) A composite curve is prepared by putting together in an arbitrary ratio four logarithm normal distribution curves each having 0.30 of a standard deviation to x value and an arbitrary average value (usually corresponding to a chain length A at the peak position).

(3) As a degree of a shift of the measured chain length distribution curve from the composite curve, the difference (deviation) between the y value of the measured chain length distribution and the composite curve at each x value, is determined, each the deviation at each x value is respectively squared, and the total values thereof (sum of squared deviation) are determined.

(4) The average values of the logarithm normal distribution curves used in (2) and the ratios put, are changed, and the above-mentioned (2) and (3) are repeated to obtain a composite curve having the minimum sum of squared deviation.

(5) Among four logarithm normal curves constituting the composite curves obtained in (4), a molecular chain length at the peak of the logarithm normal curve having the highest molecular weight is determined. Herein, the number of plotted data on the chain length curve is at least 300 to obtain a continuous distribution curve. Further, the sum of squared deviation is usually determined based on the plotted data of at least 300.

The minimum value of the sum of squared deviation becomes usually 0.5% or less to the sum of squared deviation when ratios of the four logarithm normal curves are all zero. Further, the ratio of the peak area of the logarithm normal curve corresponding to the component of the highest molecular weight is usually 10% or more based on 100% of the total components.

The ethylene-α-olefin copolymer of the present invention has a molecular weight distribution of preferably from 5 or more, more preferably from 5.5 or more, and most preferably from 6.5 or more, from the viewpoint of improvement of moldability, particularly reduction of extrusion load. On the other hand, the molecular weight distribution is preferably 25 or less, more preferably 20 or less, most preferably 15 or less, from the view point of improvement of antiblocking property of extrusion-molded articles.

The above-mentioned molecular weight distribution is a value obtained by calculating the weight-average molecular weight (Mw) and the number-average molecular weight (Mn) each converted into polystyrene molecular weight obtained by the above-mentioned gel permeation chromatography measurement, and dividing Mw by Mn (Mw/Mn).

Generally, it is known that there is a relation to which a melt tension(MT) decreases with an increase of a melt flow rate(MFR) between the melt flow rate and the melt tension. The ethylene-α-olefin copolymer of the present invention has a high melt tension such as a one having a structure like an ethylene-α-olefin copolymer which has a structure having a long chain branching, and as the copolymer, an ethylene-α-olefin copolymer which satisfies preferably the formula(5) from the viewpoints of reduction of extrusion load and of improving a haul molding processability, more preferably the formula(5'), most preferably the formula(5"). In contrast, conventional ordinary ethylene-α-olefin copolymers do not satisfy the left side of the formula(5) below.

$$2.0 \times MFR^{-0.59} < MT < 40 \times MFR^{-0.59} \quad (5)$$

$$2.2 \times MFR^{-0.59} < MT < 25 \times MFR^{-0.59} \quad (5')$$

$$2.5 \times MFR^{-0.59} < MT < 15 \times MFR^{-0.59} \quad (5'')$$

The melt tension (MT, unit: cN) of the ethylene-α-olefin copolymer is measured as follows: a melted resin is extruded into air of room temperature through an orifice having a diameter of 2.09 mmϕ and a length of 8 mm at a share rate of 7.4 sec$^{-1}$ and 190° C. A strand extruded is taken up using a roller having a diameter of 50 mm while increasing rotation speed at a rate of 40 rpm/minute. A value of tension at which the strand shows just before breaking is regarded as the melt tension.

Generally, it is known that there is a relation to which an intrinsic viscosity ([η], unit: dL/g) decreases with an increase of an MFR between the MFR and the intrinsic viscosity. The ethylene-α-olefin copolymer of the present invention is a copolymer having a structure like an ethylene-α-olefin copolymer which has a structure having a long chain branching, and its intrinsic viscosity is usually lower than that of the conventional one when both copolymers have the same MFR each other. The ethylene-α-olefin copolymer of the present invention satisfies preferably the following formula(6), more preferably the following formula(6'), most preferably the following formula(6"), from the viewpoint of reduction of extrusion load and improvement of impact strength of molded articles obtained:

$$1.02 \times MFR^{-0.094} < [\eta] < 1.50 \times MFR^{-0.156} \quad (6)$$

$$1.05 \times MFR^{-0.094} < [\eta] < 1.47 \times MFR^{-0.156} \quad (6')$$

$$1.08 \times MFR^{-0.094} < [\eta] < 1.42 \times MFR^{-0.156} \quad (6'')$$

On the other hand, the conventional ethylene-α-olefin copolymer does not usually satisfy the right side of the following formula(6).

The intrinsic viscosity ([η]; unit is dl/g) in the above-mentioned formulas is determined by the following manners:

A tetralin solution containing 5 wt % of 2,6-di-tert-butyl-p-cresol(BHT) (hereinafter, referred to as "blank solution") as a heat degradation preventing agent and a tetralin solution (hereinafter, referred to as "sample solution") obtained by dissolving an ethylene-α-olefin copolymer in the blank solution so that a concentration of the copolymer becomes 1 mg/ml, are prepared, and a relative viscosity (ηrel) is calculated from falling times at 135° C. of the above-mentioned sample solution and blank solution using an Ubbellohde viscometer, then, an intrinsic viscosity is determined from the following calculation.

$$[\eta]=23.3 \times \log(\eta rel)$$

Generally, it is known that, between an intrinsic viscosity and swell ratio(SR) of an ethylene-α-olefin copolymer, there is a relation in which the SR increases with the decrease of intrinsic viscosity.

It is assumed that the ethylene-α-olefin copolymer of the present invention has a structure like an ethylene-α-olefin copolymer which has a structure having a long chain branching, the present copolymer is usually higher in SR than an ordinary ethylene-α-olefin copolymer conventionally known. From the viewpoint of reduction of extrusion load and improvement of optical properties of molded articles thereof, the ethylene-α-olefin copolymer of the present invention preferably satisfies the following formula (7) or (8):

When [η]<1.20, $$-0.91 \times [\eta]+2.262 < SR < 2 \quad (7)$$

When [η]≧1.20, $$1.17 < SR < 2 \quad (8)$$

In contrast, the conventional ethylene-α-olefin copolymer does not usually satisfy the left side of the above-mentioned formula(7) or (8). Further, as the polymer structure of like long chain branching in the ethylene-α-olefin copolymer of the present invention, a structure in which polymer chains are closely entangled each other, is preferable, further, the copolymer preferably satisfies the following formulas (7') or (8'), more preferably the following formulas (7") or (8"):

When $[\eta]<1.23$, $$-0.91\times[\eta]+2.289<SR<1.9 \quad (7')$$

When $[\eta]\geqq 1.23$, $$1.17<SR<1.9 \quad (8')$$

When $[\eta]<1.30$, $$-0.91\times[\eta]+2.353<SR<1.8 \quad (7")$$

When $[\eta]\geqq 1.30$, $$1.17<SR<1.8 \quad (8")$$

The swell ratio (SR) in the above-mentioned formula (8) is a value obtained by dividing a diameter (D, unit is mm) measured at any point between 1 and 6 mm from the tip of strand by the diameter ($D_0$, unit is mm) of an orifice with 2.095 mm ($D/D_0$), wherein the strand is obtained by extruding in the shape of a strand during measuring above mentioned MFR at 190° C. under a load of 21.18 N (2.16 kg) and solidified by cooling it. The diameter D is obtained as an average of three strand samples.

The melt flow rate ratio (MFRR) of the ethylene-α-olefin copolymer of the present invention is, from the viewpoint of reduction of extrusion load and improvement of moldability, preferably 60 or more, more preferably 70 or more, most preferably 80 or more. There is not particularly the upper limit, it is preferably 300 or less. The MFRR is a value obtained by dividing a melt flow rate value measured at 190° C. under a load of 211.82 N (21.60 kg) by an MFR measured under a load of 21.18 N(2.16 kg) according to JIS K7210-1995. For the above-mentioned melt flow rate measurement, a polymer into which about 1000 wt-ppm of an antioxidant has been previously added is usually used.

When the density of the ethylene-α-olefin copolymer of the present invention is not more than 927 kg m³, the ethylene-α-olefin copolymer preferably satisfies, from the viewpoint of improvement of heat resistance, the following (A) or (B):
- (A) the ethylene-α-olefin copolymer has at least two melting points (unit is ° C.), and the maximum melting point (Tmax) is 115° C. or higher, preferably 118° C. or higher, or
- (B) the ethylene-α-olefin copolymer has one melting point and contains a component of a melting temperature of 118° C. or higher In addition, when the density is over 0.927 kg/m³, the copolymer is usually superior in heat resistance.

The above-mentioned melting point and presence or absence of the component fused above a specific temperature can be determined from a melting curve measured with a differential scanning calorimeter. The melting curve can be obtained by (1) keeping a sample at 150° C. for 2 minutes, then, (2) cooling the sample from 150° C. to 40° C. at 5° C./minute, (3) keeping the sample at 40° C. for 2 minutes, and then, (4) heating the sample 40° C. to 150° C. at 5° C./min, using a differential scanning type calorimeter DSC-7 type apparatus manufactured by Perkin Elmer, Ltd. Herein, the melting curve is a differential scanning calorie measuring curve measured in (4). In addition, the melting point is a peak temperature of a fusion peak, and the weight of sample subjected to the measurement is usually about 10 mg.

The ethylene-α-olefin copolymer of the present invention is preferably low in a cold xylene soluble part percentage (hereinafter, referred to as "CXS") (CXS; unit is % by weight) from the view point of improvement of anti-blocking property and more preferably satisfies the following formula (9):

$$0.1<CXS<10^{(30.3-0.0327\times d+0.354\times \log MFR)} \quad (9)$$

d: Density of ethylene-α-olefin copolymer (unit: kg/cm³)
MFR: MFR of ethylene-α-olefin copolymer A heat quantity of fusion of CXS of the ethylene-α-olefin copolymer of the present invention is preferably 30 J/g or more, more preferably 50 J/g or more, most preferably 70 J/g or more from the viewpoint of improvement of anti-blocking property of molded articles obtained. On the other hand, the heat quantity of fusion is preferably 200 J/g or less from the viewpoint of improvement of transparency of molded articles obtained.

Moreover, a CXS of an ethylene-α-olefin copolymer produced by using a conventionally known Zieglar-Natta catalyst such as a catalyst prepared using titanium tetrachloride, is high and the cold xylene soluble part is low in crystallinity. Therefore, in anti-blocking property of molded articles of the copolymer, a sufficient satisfaction may not be obtained.

The CXS can be determined by the following steps (1) to (4):
- (1) About 5 g of an ethylene-α-olefin copolymer as a sample, is dissolved in 1 L of boiling xylene containing an antioxidant in a proper amount;
- (2) A boiling xylene solution prepared in (1) is cooled to room temperature over about 2 hours, and is allowed to stand still at 25° C. for 20 hours;
- (3) The xylene solution is filtered to recover a liquid part, and a xylene solvent is removed from the filtered liquid part to collect the copolymer dissolved in xylene (referred to as "cold xylene soluble part".); and
- (4) A CXS is calculated from the following equation, $$CXS=\{([\text{weight of cold xylene soluble part}](\text{unit: g})\times(1/\text{recovered liquid part}(\text{unit: liter}))\}/\text{weight of sample}(\text{unit: g})\}\times 100$$

The heat quantity of fusion of the cold xylene soluble part is a value determined by dividing the total heat quantity of fusion from 42° C. to the perfect fusion temperature (a temperature at which the fusion curve returns to the base line of high temperature side) in a fusion curve measured by a differential calorimeter (heat flux) DSC; e.g. a differential scanning calorimeter DSC-7 manufactured by Perkin Elmer, Limited) by a weight of the sample used for measurement. The melting curve can be obtained by keeping a sample at 150° C. for 2 minutes, then, cooling the sample from 150° C. to 40° C. at 5° C./min, keeping the sample at 40° C. for 2 minutes, then, and heating the sample from 40° C. to a temperature of higher than perfect fusion temperature(usually about 150° C.) at 5° C./min. The weight of the sample used for measurement is usually about 10 mg.

The method for producing an ethylene-α-olefin copolymer of the present invention includes a method in which ethylene and an α-olefin are copolymerized with a polymerization catalyst obtained by a process comprising contacting (A) a co-catalyst carrier described below, (B) a metallocene complex having a structure in which two ligands having a cyclopentadiene skeleton are connected each other through a bridging group such as an alkylene group, silylene group or the like, and (C) an organoaluminum.

The above-described co-catalyst carrier (A) is a carrier obtained by contacting (a) diethyl zinc, (b) a fluorinated phenol, (c) water, (d) inorganic particle and (e) trimethyldisilazane [$((CH_3)_3Si)_2NH$].

Examples of the fluorinated phenol(b) include pentafluorophenol, 3,5-difluorophenol, 3,4,5-trifluorophenol and 2,4,6-trifluorophenol. These can be used alone or in a combination of two or more, and pentafluorophenol alone or a combination of pentafluorophenol with another fluorinated phenol is preferably used. Further, from the viewpoint of heightening of the activation energy of flow(Ea) of the ethylene-α-olefin copolymer, it is preferable to use a combination of two kinds of phenols having the different number of fluorine, each other (e.g. pentafluorophenol/3,4,5-trifluorophenol, pentafluorophenol/2,4,6-trifluorophenol, pentafluorophenol/3,5-difluorophenol), and preferably a combination of pentafluorophenol with 3,4,5-trifluorophenol.

The molar ratio of a fluorinated phenol having a large number of fluorine to that having a small number of fluorine is 20/80 to 80/20. From the viewpoint of increase of the characteristic relaxation time t, the molar ratio is preferably smaller, and from the viewpoint of decrease of the chain length A of the highest molecular weight component, the molar ratio is preferably larger.

The inorganic particle is preferably silica gel.

The amounts of the above-mentioned components (a), (b) and (c) are not particularly restricted, and when the molar ratio (a):(b):(c) of the amounts used of the compounds is 1:x:y, it is preferable that x and y satisfy the following formula:

$$|2-X-2y| \leq 1$$

In the above-mentioned formula, x represents a number of preferably from 0.01 to 1.99, more preferably from 0.10 to 1.80, further preferably from 0.20 to 1.50, most preferably from 0.30 to 1.00.

Regarding the amount used of (d) based on (a), the amount of a zinc atom derived from (a) contained in particles obtained by contact of (a) with (d) is preferably 0.1 mmol or more, more preferably 0.5 to 20 mmol in terms of molar number of zinc atoms contained in 1 g of the resulted particles. Regarding the amount of (e) based on (d), the amount of (e) is preferably 0.1 mmol or more, more preferably 0.5 to 20 mmol per g of (d).

As a metal of (B) the metallocene complex having a structure in which two ligands having a cyclopentadiene skeleton are connected each other through a bridging group, metals of Group 4 of the Periodic Table of the Elements are preferable, and zirconium and hafnium are more preferable. Further, examples of the ligand having a cyclopentadiene skeleton include preferably an indenyl group, a methyindenyl group, a methylcyclopentadienyl group, and a dimethylcyclopentadienyl group, and examples of the bridging group include preferably an ethylene group, dimethylethylene group and dimethylsilylene group. Furthermore, the remaining group(s) bonded to the metal, include preferably, for example, a diphenoxide group and a dialkoxy group.

As the metallocene complex (B), ethylenebis(1-indenyl) zirconium diphenoxide is illustrated.

The organoaluminum compound (C) is preferably tri-isobutylaluminum or tri-n-octylaluminum.

The use amount of the metallocene complex (B) is preferably $5 \times 10^{-6}$ to $5 \times 10^{-4}$ mol per g of the co-catalyst carrier (A). The amount of the organoaluminum compound (C) is preferably from 1 to 2000 in terms of the ratio (Al/M) of the molar number of an aluminum atom (Al) in the organoaluminum compound (C) to the molar number of the metal atom (M) in the metallocene complex (B).

In the polymerization catalyst described above prepared by contacting the components (A), (B) and (C), if necessary, an electron donor (D) can be contacted in addition thereto.

The electron donor (D) is preferably triethylamine, tri-n-octylamine or the like.

From the viewpoint of shortening of the chain length A of the highest molecular weight component and the characteristic relaxation time t, it is preferable to use the electron donor(D), and the used amount of the (D) is preferably 0.1 mol % or more per mole of Al atom in the organoaluminum compound (C), more preferably 1 mol % or more. On the other hand, from the viewpoint of heightening the polymerization activity, the amount is preferably 10 mol % or less, more preferably 5 mol % or less.

The polymerization method includes preferably a continuous polymerization method forming particle of an ethylene-α-olefin copolymer polymerized, for example, a continuous gas phase polymerization, continuous slurry polymerization and continuous bulk polymerization, and a continuous gas phase polymerization is more preferable.

The gas phase polymerization apparatus is usually an apparatus having a fluidized bed type reaction vessel, and preferably an apparatus having a fluidized bed type reaction vessel having an enlarge portion. A stirring blade may be installed in the reaction vessel.

As the method of feeding components for a metallocene olefin polymerization catalyst used in production of an ethylene-α-olefin copolymer of the present invention, there are usually used a method in which components are fed using an inert gas such as nitrogen or argon, hydrogen, ethylene or the like under a water-free condition, and a method in which components are dissolved or diluted in a solvent and fed in the state of solution or slurry. Components of the catalyst may be individually fed, or any components may be previously contacted in any order before feeding.

It is preferable that, before effecting real polymerization, preliminary polymerization (hereinafter, referred to as "prepolymerization") has been conducted, and the preliminary polymerized catalyst (hereinafter, referred to as "pre-polymerized catalyst") components are used as the catalyst components or catalyst for the real polymerization(hereinafter, sometimes referred to merely as "polymerization").

The polymerization temperature is usually lower than the temperature at which a copolymer to be produced is melted, and preferably from about 0° C. to about 120° C., more preferably from about 30° C. to about 100° C. The polymerization temperature is preferably low, more preferably 80° C. or lower from the viewpoint of shortening the chain length A of the highest molecular weight component and the characteristic relaxation time t, or of reducing a CXS.

During polymerization, an inert gas may be coexisted in the polymerization gas, and hydrogen may be added.

The concentration of hydrogen to ethylene in the polymerization gas is preferably high from the viewpoint of shortening the chain length A of the highest molecular weight component and characteristic relaxation time t of the ethylene-α-olefin copolymer, on the other hand, the hydrogen concentration is preferably low from the viewpoint of reducing a CXS. Further, the concentration of the α-olefin to ethylene in the polymerization gas is preferably low from the viewpoint of heightening the fusion calorie of CXS.

The polymerization time is usually from 0.5 to 20 hours, preferably from 1 to 10 hours. Further, the linear velocity of the reaction gas passed through a polymerization vessel is usually from 0.05 to 2 m/second, preferably from 0.1 to 0.5 m/second. The polymerization time is preferably shorter or the linear velocity is preferably higher, from the viewpoint of reducing a CXS of the ethylene-α-olefin copolymer.

In the production of the ethylene-α-olefin copolymer of the present invention, it is preferable that the process contains a step of kneading an ethylene-α-olefin copolymer obtained by polymerization with (1) an extended flow kneading die, for example, a die developed by Utracki et al and disclosed in U.S. Pat. No. 5,451,106, (2) an extruder equipped with counter-rotating twin screws having a gear pump, or the like.

The ethylene-α-olefin copolymer of the present invention may contain known additives, if necessary. Examples of the additives include antioxidants, weather resistant agents, lubricants, anti-blocking agents, antistatic agents, defogging agents, non-dripping agents, pigments, fillers and the like.

The ethylene-α-olefin copolymer of the present invention is molded to various shaped articles (e.g. films, sheets, bottles, trays) by an extrusion molding(e.g. inflation film molding, T-die film forming), injection molding, compression molding, or the like. As the molding method, an extrusion molding is preferably applied, and extrusion molded articles are applied to a wide variety of uses such as food packaging and surface protection.

EXAMPLE

The present invention will be illustrated based on examples and comparative examples below.

Physical properties and structures in Examples and Comparative Examples were measured according to the following methods:

[Physical Properties and Structures of Polymer]

(1) Melt Flow Rate (MFR)

It was measured by A-method under conditions of 190° C. and a load of 21.18N according to JIS K7210-1995. For the measurement, a polymer into which 1000 ppm of an antioxidant (Irganox 1076® manufactured by Ciba Specialty Chemicals, Ltd.)had been previously added was used.

(2) Melt Flow Rate Ratio (MFRR)

The melt flow rate ratio (MFRR) is a value obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, a polymer into which 1000 ppm of an antioxidant (Irganox 1076® manufactured by Ciba Specialty Chemicals, Ltd.) had been previously added was used.

(3) Swell Ratio (SR)

It is a value obtained by dividing a diameter D measured at any point between 1 and 6 mm from the tip of strand by the diameter ($D_0$) of an orifice with 2.095 mm ($D/D_0$), wherein the strand was obtained by extruding in the shape of a strand during measuring the above-mentioned MFR at 190° C. under 21.18 N (2.16 kg) of loads and solidified by cooling it. The diameter D was obtained as an average of three strand samples.

(4) Density (Unit: $kg/m^3$)

The density of a polymer was measured according to A method in JIS K7112-1980 after annealed according to JIS K6760-1995.

(5) Activation Energy of Flow (Ea, unit: kJ/mol)

Melt complex viscosities and angular frequencies at 130° C., 150° C., 170° C. and 190° C. were measured under the following conditions using a viscoelasticity measuring apparatus (Rheometrics Mechanical Spectrometer RMS-800 manufactured by Rheometrics, Limited) to prepare a melt complex viscosities-angle frequency curve. From the curve obtained, a master curve of melt complex viscosities-angular frequency at 190° C. was prepared using a computer software Rhios V.4.4.4 (manufactured by Rheometrics, Limited) and the activation energy (Ea) was determined.

<Measurement Condition>
Geometry: parallel plate
Plate diameter: 25 mm
Plate distance: 1.5 to 2 mm
Strain: 5%
Angle frequency: 0.1 to 100 rad/minute
Measurement atmosphere: nitrogen (6) Melt Complex Viscosity($\eta$, Unit: Pa·Second)

A melt complex viscosity at 100 rad/second was determined from the curve of melt complex viscosities-angular frequency at 190° C. prepared in (5) described above.

(7) Characteristic Relaxation Time (t, Unit: Second)

It was determined from the master curve of melt complex viscosities-angular frequency at 190° C. prepared in (5) described above using the computer software Rhios V.4.4.4 (manufactured by Rheometrics, Limited).

(8) Molecular Weight Distribution (Mw/Mn)

A weight-average molecular weight(Mw) and number-average molecular weight(Mn) were measured using a gel permeation chromatography (GPC) under the following conditions, and Mw/Mn was determined.

(i) Apparatus: Waters 150C (manufactured by Water limited)
(ii) Separation column: TOSPH TSKgelGMH-HT
(iii) Measurement temperature: 140° C.
(iv) Carrier: o-dichlorobenzene
(iv) Flow amount: 1.0 mL/min
(v) Injection amount: 500 μL
(vi) Detector: differential refraction
(vii) Standard substance of molecular weight: standard polystyrene (9) Chain Length of Highest Molecular Weight Component It was calculated using the molecular weight distribution curve obtained in (8) by the following procedures (i) to (v):

(i) A chain length distribution curve, in which a weight ratio dW/d(log Aw)(y value) to log Aw (x value) as a logarithm of molecular chain length Aw is plotted, is determined from the molecular weight distribution curve. Herein, in the gel permeation chromatography measurement, a molecular weight of a standard polystyrene was converted into a molecular chain length by the following equation:

Molecular chain length (angstrom)=Molecular weight of standard polystyrene/40.9

(ii) A composite curve was prepared by putting together four logarithm normal distribution curves each having 0.30 of a standard deviation to x value and an arbitrary average value (usually corresponding to a chain length A at the peak position) in arbitrary ratios.

(iii) The sum of squared deviation between y values of the chain length distribution curve obtained in (i) and the composite curve obtained in (ii) at the same x value, was determined.

(iv) The average values of the logarithm normal distribution curves and ratios of the logarithm normal distribution curves to be put used in (ii) were changed and the above-mentioned steps (ii) and (iii) were repeated to obtain a composite curve in which, defining the sum squared of deviation as T when the ratios of four logarithm normal curves were all zero, the sum of squared deviation became 0.005×T or less.

(v) Among four logarithm normal curves constituting the composite curve obtained in (iv), a peak molecular chain length of the logarithm normal distribution curve having the highest molecular weight was determined.

(10) Differential Scanning Calorimeter Measurement

It was measured using a sample of about 100 mg with a differential calorimeter (DSC-7 type manufactured by Perkin-Elmer, Limited) of a sample under the following conditions to prepare a melting curve.

<Measurement Condition>

A sample was kept at 150° C. for 2 minutes, cooled from 150° C. to 40° C. at 5° C./min, kept at 40° C. for 2 minutes, then heated from 40° C. to 150° C. at 5° C./min.

(11) Intrinsic Viscosity ([η], Unit: dL/g)

A tetralin solution in which 2,6-di-tert-butyl-p-cresol (BHT) (blank solution) was dissolved at a concentration of 0.5 g/L (hereinafter, referred to as "blank solution") and a sample solution in which an ethylene-α-olefin copolymer was dissolved in the blank solution so that the concentration of the copolymer became 1 mg/1 mL, were prepared, falling times of the sample solution and blank solution were measured using an Ubbellohde viscometer, a relative viscosity (ηrel) at 135° C. was calculated from the falling times, then an intrinsic viscosity ([η]) was calculated by the following formula:

[η]=23.3×log(ηrel)

[Properties of Film]

(12) Fish Eye (Unit: Number/m$^2$)

An ethylene-α-olefin copolymer was used and processed using an inflation film molding machine (manufactured by Sumitomo Heavy Industries Modern Ltd., a full flight type single screw extruder (40 mmφ, L/D=26), a dice (75 mmφ, a lip gap of 1 mm) under conditions of a processing temperature of 170° C., an extrusion rate of 12.5 kg/hr and a blow ratio of 1.8, to obtain a film having a thickness of 30μ. The number of defects(fish eyes) of 0.2 mm or larger per 1 m$^2$ of thus obtained film was counted using LAZER EYE-1000 (manufactured by Yasukawa Denki Seisakusho, K.K.) under conditions of a flying spot transmitted light receiving mode and a test width of 300 mm.

(13) Transparency (Haze, unit: %)

An inflation film of 80 μm in thickness was formed using a full flight type single screw extruder (30 mmφ, L/D=28) manufactured by Placo K.K., a dice (die diameter of 50 mmφ, a lip gap of 0.8 mm), and a double slit air ring under conditions of a processing temperature of 170° C., an extrusion rate of 5.5 kg/hr, a frost line distance (FLD) of 200 mm and a blow ratio of 1.8. The haze value of the film formed above was measured according to a method defined in ASTM D1003. When this value is smaller, transparency is more excellent.

[Moldability]

(14) Resin Pressure (Unit: MPa)

When the film of 80μ in thickness was formed in the same manner as in (13) described above, the resin pressure of the extruder was measured. When the resin pressure is lower, the moldability is more excellent.

(15) Melt Tension (MT, Unit: cN)

A melted resin filled in a barrel of 9.5 mmφ was extruded through an orifice having a diameter of 2.09 mmφ and a length of 8 mm with a piston at an extrusion speed of 5.5 mm/min (share rate of 7.4 second$^{-1}$) at 190° C. using a melt tension tester manufactured by Toyo Seiki Seisakusho, and the extruded resin was taken up using a roller having a diameter of 50 mmφ with at a upward rotation speed of 40 rpm/minute. A value of tension which the strand shows just before breaking was regarded as the melt tension. When this value is larger, the moldability is more excellent.

Example 1

(1) Preparation of Co-Catalyst Carrier

Into a reactor equipped with a stirrer, purged with nitrogen were charged 2.8 kg of silica(Sylopol 1948 manufactured by Devison, Ltd; average particle size=55 μm; pore volume=1.67 ml/g; specific surface area=325 m$^2$/g) which had been heat-treated at 300° C. under a nitrogen flow and 24 kg of toluene, then the resulting mixture was stirred. The mixture was cooled to 5° C., then, a mixed solution of 0.91 kg of 1,1,1,3,3,3-hexamethyldisilazane and 1.43 kg of toluene was added thereto dropwise over 33 minutes while keeping 5° C. After completion of the dropping, the mixture was stirred at 5° C. for 1 hour and at 95° C. for 3 hours and filtrated. Thus obtained solid was washed six times with each toluene of 21 kg. Thereafter, 6.9 kg of toluene was added to obtain a slurry, then, the mixture was allowed to stand still overnight.

Into the slurry obtained above were charged 2.05 kg of a hexane solution of diethylzinc (diethylzinc concentration: 50 wt %) and 1.3 kg of hexane, then stirred. Thereafter, the mixture was cooled to 5° C., then a mixed solution of 0.77 kg of pentafluorophenol and 1.17 kg of toluene was added thereto dropwise over 61 minutes while keeping 5° C. After completion of the dropping, the mixture was stirred at 5° C. for 1 hour, then at 40 for 1 hour. Then, 0.11 kg of H$_2$O was dropped over 1.5 hours while keeping 5° C. After completion of the dropping, the mixture was stirred at 5° C. for 1.5 hours, additionally at 55° C. for 2 hours. Then, 1.4 kg of a hexane solution of diethylzinc (diethylzinc concentration: 50 wt %) and 0.8 kg of hexane were charged to the resultant. After cooled to 5° C., a mixed solution of 0.42 kg of 3,4,5-trifluorophenol and 0.77 kg of toluene was added dropwise over 60 minutes while maintaining 5° C. of a temperature inside the reactor. After completion of the dropping, the resulting mixture was stirred at 5° C. for 1 hour, additionally at 40° C. for 1 hour. Thereafter, 0.077 kg of H$_2$O was added dropwise over 1.5 hours while maintaining 5° C. of a temperature inside the reactor. After completion of the dropping, the resulted mixture was stirred at 5° C. for 1.5 hours, at 40° C. for 2 hours, additionally at 80° C. for 2 hours. Thereafter, stirring was terminated, the supernatant liquid was removed so that the remainder became 16 L, 11.6 kg of toluene was added, then the resulting mixture was stirred. The mixture was heated to 95° C., then stirred for 4 hours. The mixture was allowed to stand still to cause precipitation of solid components, and when the interface of a layer of the precipitated solid components and an upper layer of slurry part was observed, the slurry part of the upper layer was removed, then, the remaining liquid component was filtrated through a filter. The solid product obtained was washed 4 times with each toluene of 20.8 kg, then three times with each hexane of 24 L. Then, the solid was dried to obtain a solid component (hereinafter, referred to as "co-catalyst carrier (A1)").

(2) Preparation of Pre-Polymerization Catalyst Component

Into a previously nitrogen-purged autoclave having a content volume of 210 L equipped with a stirrer were charged 0.70 kg of the co-catalyst carrier (A1), 0.5 L of hydrogen and 80 L of butane under normal temperature and normal pressure, then the autoclave was heated to 30° C. Further, ethylene was charged in an amount corresponding to 0.03 MPa of gas phase pressure in the autoclave, and, after the system was stabilized, 210 mmol of triisobutylaluminum, 70 mmol of racemi-ethylenebis(1-indenyl)zirconium diphenoxide were added to initiate polymerization. The mixture was heated to 33° C. and further to 49° C. while continuously feeding ethylene and hydrogen, polymerization for 4 hours in total was conducted. After completion of the pre-polymerization, ethylene, butane, hydrogen gas and the like were purged and the remaining solid was dried under vacuum at room temperature, to obtain a co-catalyst component in which 13 g of ethylene had been pre-polymerized per g of the above-mentioned co-catalyst carrier (A1).

(3) Production of Ethylene-α-Olefin Copolymer

Using the pre-polymerization catalyst component obtained above, copolymerization of ethylene and 1-hexene was carried out in a continuous type fluidized bed gas phase polymerization apparatus to obtain ethylene-1-hexene copolymer powder.

The polymerization conditions included a temperature of 75° C., a total pressure of 2 MPa, a hydrogen molar ratio to ethylene of 0.9% and a 1-hexene molar ratio to ethylene of 1.9%, and during the polymerization, ethylene, 1-hexene and hydrogen were continuously fed for maintaining the gas composition constant, and the linear velocity of the reaction gas in the polymerization apparatus was 0.28 m/second. Further, the above-mentioned pre-polymerization catalyst component, tri-isobutyl aluminum and triethylamine of 3% in terms of a molar ratio to tri-isobutyl aluminum were fed continuously, so as to maintain a total powder weight in the fluidized bed of 80 kg constant. The average polymerization time was 4 hr.

The powder of ethylene-1-hexene copolymer thus obtained was granulated under conditions of a feed rate of 50 kg/hr, a screw rotation of 450 rpm, gate opening of 50%, suction pressure of 0.1 MPa, and resin temperature of 200 to 230° C. to obtain an ethylene-1-hexene copolymer. Properties of the obtained ethylene-1-hexene copolymer were evaluated and the results were shown in Table 1.

Example 2

(1) Preparation of Pre-Polymerization Catalyst Component

A pre-polymerization catalyst component was prepared in the same manner as in (1) and (2) of Example 1.

(2) Production of Ethylene-α-Olefin Copolymer

Copolymerization of ethylene and 1-hexene was carried out in the same manner as in (3) of Example 1 except that the molar ratio of hydrogen to ethylene was changed to 0.6%, the molar ratio of 1-hexene to ethylene was changed to 1.5% and the linear velocity was changed to 0.25 m/second. An antioxidant(Sumilizer GP manufactured by Sumitomo Chemical Company, Ltd.) of 750 ppm was blended to thus obtained ethylene-1-hexene copolymer powder, and the blend was granulated in the same manner as in Example 1 to obtain an ethylene-1-hexene copolymer. Evaluation results of the copolymer were shown in Table 1.

Example 3

(1) Preparation of Co-Catalyst Carrier

Into a four-necked 3L-flask purged with nitrogen were charged 0.2 kg of silica heat-treated at 300° C. under nitrogen flow (Sylopol 1948 manufactured by Devison; average particle size=61 μm; pore volume=1.70 ml/g; specific surface area=291 m$^2$/g) and 1.2 L of toluene, then the resulting mixture was stirred. The mixture was cooled to 5° C., then, a mixed solution of 84.4 ml (0.4 mmol) of 1,1,1,3,3,3-hexamethyldisilazane and 115 mL of toluene was added thereto dropwise over 25 minutes. After completion of the dropping, the mixture was stirred at 5° C. for 1 hour and at 95° C. for 3 hours and filtrated. Thus obtained solid was washed four times with each toluene of 1.2 L and 95° C. using a filter. Thereafter, 1.2 L of toluene was added to obtain a slurry, then, the mixture was allowed to stand still overnight.

Into the slurry obtained above were charged 0.550 L of a hexane solution of diethylzinc (diethylzinc concentration: 2.00 mol/L), then a mixed solution of 105 g (0.570 mol) of pentafluorophenol and 173 ml of toluene was added thereto dropwise over 65 minutes. After completion of the dropping, the mixture was stirred at 5° C. for 1 hour, then at 40° C. for 1 hour. After cooled to 5° C. with an ice bath, 14.9 g (0.828 mol) of H$_2$O was dropped over 90 minutes. After completion of the dropping, the mixture was stirred at 5° C. for 1.5 hours, additionally at 40° C. for 2 hours, then was allowed to stand still at room temperature overnight. Thereafter, the mixture was stirred at 80° C. for 2 hours, then was allowed to stand still to cause precipitation of a solid component, and when an interface of a layer of the precipitated solid component and an upper layer of slurry part was observed, the slurry part of the upper layer was removed, then, the remaining liquid component was filtrated through a filter. Further, there was carried out a washing operation composed of adding 1.7 L of toluene to the obtained solid, then allowing the resulting mixture to stand still after stirring at 95° C. for 2 hours to cause precipitation of a solid component, and, when an interface of a layer of the precipitated solid component and an upper layer of a slurry part was observed, removing the slurry part of the upper layer. Furthermore, the above-described washing operation using 1.7 L of 95° C. toluene was carried out four times and subsequently the operation using 1.7 L of hexane at room temperature instead of 95° C. toluene was carried out twice. The remained liquid component was filtered by a filter to obtain a washed solid. Thereafter, the solid was dried at room temperature for 3 hours under vacuum to obtain a solid component(hereinafter, referred to as "co-catalyst carrier (A2)").

(2)Preparation of Pre-Polymerization Catalyst Component

Into a previously nitrogen-purged autoclave having a content volume of 210 L equipped with a stirrer were charged 0.48 kg of the co-catalyst carrier (A2), 5 L of hydrogen under normal temperature and normal pressure, 100 L of butane and 0.12 kg of 1-butene, then the autoclave was heated to 25° C. Further, ethylene was charged in an amount corresponding to 0.07 MPa of gas phase pressure in the autoclave, and after stabilization in the system, 1000 mmol of triisobutylaluminum, 75 mmol of racemi-ethylenebis(1-indenyl)zirconium diphenoxide were added to initiate polymerization. The mixture was heated to 29° C. and further to 30° C. while continuously feeding ethylene and hydrogen, pre-polymerization for 4 hours in total was carried out. After completion of the polymerization, ethylene, butane, hydrogen gas and the like were purged and the remaining solid was dried under vacuum at room temperature, to obtain a pre-polymerization catalyst component in which 35 g of ethylene and 1-butene had been pre-polymerized per g of the above-mentioned co-catalyst carrier (A2).

(3) Production of Ethylene-α-Olefin Copolymer

Using the pre-polymerization catalyst component obtained above, copolymerization of ethylene and 4-methyl-1-penetene was carried out in a continuous type fluidized bed gas phase polymerization apparatus to obtain ethylene-4-methyl-1-pentene copolymer powder.

The polymerization conditions included a temperature of 85° C., a total pressure of 2 MPa, a hydrogen molar ratio to ethylene of 0.9% and a 4-methyl-1-penetene molar ratio to ethylene of 2.6%, and during the polymerization, ethylene, 4-methyl-1-pentene and hydrogen were continuously fed for maintaining the gas composition constant. The linear velocity of the polymerization gas was 0.34 m/second. The above-mentioned catalyst component and tri-isobutyl aluminum were fed continuously, so as to maintain a total powder weight in the fluidized bed of 80 kg constant. The average polymerization time was 3 hours. The produced copolymer was further dried in a 60 oven after de-ashing of 75° C. in heptane to obtain an ethylene-4-methyl-1-pentene powder.

To the powder of ethylene-4-merhyl-1-pentene copolymer obtained, 1000 wt-ppm of calcium stearate and 1800 wt-ppm of Sumilizer GP (manufacture by Sumitomo Chemical Company, Ltd.) were added, the mixture obtained was granulated with a single screw extruder (40 mmϕ, L/D=28, fullflight type screw) (manufactured by Tanabe Plastics K.K.) under conditions of 150° C. and a screw rotation number of 80 rpm to obtain an ethylene-4-methy-1-pentene copolymer. The property and molding processability of the ethylene-4-methy-1-pentene copolymer were shown in Table 1.

Comparative Example 1

(1) Preparation of Co-Catalyst Carrier

Into a stainless steel reactor of an inner volume of 180 L equipped with a stirrer and a jacket, purged with nitrogen were charged 9.7 kg of silica heat-treated at 300° C. under nitrogen flow (Sylopol 1948 manufactured by Devison; average particle size=58 μm; pore volume=1.65 ml/g; specific surface area=298 m²/g) and 100 L of toluene. After the mixture was cooled to 2° C., a toluene solution (23.3 kg) of PMAO (PMAO-s, manufactured by Tosoh-Finechem Ltd) (75.9 mol in terms of Al atom) was added thereto dropwise over 62 minutes. After completion of the dropping, the mixture was stirred at 5° C. for 30 minutes, heated to 95° C. over 2 hours, then stirred at 95° C. for 4 hours. Thereafter, the mixture was cooled to 40° C., then transferred to another stainless steel reactor of an inner volume of 180 L equipped with a stirrer and a jacket, purged with nitrogen. A component derived from silica in the mixture was precipitated over 50 minutes, then a slurry component of an upper layer was removed. Thereafter, as a washing operation, sedimentation was carried out over about 45 minutes after adding 100 L of toluene and stirring for 10 minutes, then a slurry of the upper layer was removed. Then, the above-described washing operation was repeated three times. Then, the precipitated slurry was transferred to a filtering machine made of stainless steel having an inner volume of 430 L (filtering machine having a filter, a stirrer and a jacket) purged with nitrogen with 120 L of toluene. After stirring for 10 minutes, filtration was carried out, then filtration was carried out again after adding 100 L of toluene and stirring for 10 minutes. Further, as a washing operation, a filtration was carried out after an addition of 100 L of hexane and stirring of 10 minutes. This washing operation was repeated twice in total. Thus obtained slurry was transferred with 70 L of hexane to a dryer having an inner volume of 210 L (dryer having a stirrer and a jacket), made of SUS and purged with nitrogen. Then, drying was carried out by flowing nitrogen at a jacket temperature of 80° C. for 7.5 hours to obtain a solid component of 12.6 kg(hereinafter, referred to as "co-catalyst carrier(S)").

(2) Preparation of Pre-Polymerization Catalyst Component

Into a previously nitrogen-purged autoclave having a content volume of 210 L equipped with a stirrer were charged 120 L of butane containing triisobutylaluminum of a concentration of 2.5 mmol/L and 40 L of hydrogen converted under normal temperature and normal pressure, then the autoclave was heated to 47° C. Further, ethylene was charged in an amount corresponding to 0.3 MPa of gas phase pressure in the autoclave, and after the system was stabilized, 300 mmol of triisobutylaluminum, 15 mmol of racemi-ethylenebis(1-indenyl)zirconium dichloride were charged, subsequently 0.25 kg of the co-catalyst carrier(S) was added to initiate polymerization, the pre-polymerization was carried out for a total time of 4 hours while continuously feeding ethylene and hydrogen. After completion of polymerization, ethylene, butane and hydrogen gas were purged and the produced solid was dried under vacuum at room temperature, to obtain a pre-polymerized catalyst component in which 33 g of ethylene had been polymerized per g of the above-mentioned co-catalyst carrier (S).

(2) Production of Ethylene-α-Olefin Copolymer

Copolymerization of ethylene and 1-hexene was carried out in the same manner as in (3) of Example 1 except that the molar ratio of hydrogen to ethylene was changed to 0.15%, and the molar ratio of 1-hexene to ethylene was changed to 1.8% to obtain an ethylene-1-hexene copolymer. Calcium stearate of 1000 ppm and an antioxidant(Sumilizer GP manufactured by Sumitomo Chemical Company, Ltd.) of 1800 ppm was blended with the copolymer, then the resulting mixture was granulated with a single screw extruder (40 mmϕ, L/D=28, full flight type screw) (manufactured by Tanabe Plastics K.K.) under conditions of 150° C. and a screw rotation number of 80 rpm to obtain an ethylene-1-hexene copolymer. The property and molding processability of the copolymer were shown in Table 1.

Comparative Example 2

(1) Preparation of Co-Catalyst Carrier

Into a four-necked flask of 3 L purged with nitrogen were charged 0.2 kg of silica heat-treated at 300° C. under nitrogen flow (Sylopol 1948 manufactured by Devison; average particle size=61 μm; pore volume=1.70 ml/g; specific surface area=291 m²/g) and 1.2 L of toluene, then the resulting mixture was stirred. The mixture was cooled to 5° C., then, a mixed solution of 84.4 ml (0.4 mmol) of 1,1,1,3,3,3-hexamethyldisilazane and 115 ml of toluene was added thereto dropwise over 25 minutes. After completion of dropping, the mixture was stirred at 5° C. for 1 hour and at 95° C. for 3 hours and filtrated. Thus obtained solid was washed four times with each toluene of 1.2 L and 95° C. using a filter. Thereafter, 1.2 L of toluene was added to obtain a slurry, then, the mixture was allowed to stand still overnight.

Into the slurry obtained above were charged 0.550 L of a hexane solution of diethylzinc (diethylzinc concentration: 2 mol/L), then the mixture was cooled to 5° C. A mixed solution of 105 g (0.570 mol) of pentafluorophenol and 173 ml of toluene was added thereto dropwise over 65 minutes. After completion of dropping, the mixture was stirred at 5° C. for 1 hour, then at 40° C. for 1 hour. After cooled to 5° C. with an ice bath, 14.9 g (0.828 mol) of H₂O was dropped over 90 minutes. After completion of dropping, the mixture was stirred at 5° C. for 1.5 hours, additionally at 40° C. for 2 hours, then was allowed to stand still at room temperature overnight. Thereafter, the mixture was stirred at 80° C. for 2 hours, then was allowed to stand still to cause precipitation of a solid component, and when the interface of a layer of the precipitated solid component and an upper layer of slurry part (suspension) was observed, the slurry part of the upper layer was removed, then, after the remaining liquid component was filtrated off through a filter, 1.7 L of toluene was added and the resulting mixture was stirred at 95° C. for 2 hours. The mixture was allowed to stand still to cause precipitation of a solid component, and when the interface of a layer of the precipitated solid component and an upper layer of slurry part was observed, the slurry part of the upper layer was removed, then, the remaining liquid component was filtrated off through a filter.

Thereafter, the similar separation operations as above using toluene of 1.7 L and 95° C. and then using hexane of 1.7 liters and room temperature were carried out 4 times and twice, respectively. Thereafter, the solid was dried to obtain 3.9 kg of a solid component (hereinafter, referred to as "co-catalyst carrier (A3)").

(2) Preparation of Pre-Polymerization Catalyst Component

Into a previously nitrogen-purged autoclave having a content volume of 210 L equipped with a stirrer were charged 100 L of butane containing triisobutylaluminum at a concentration of 2.5 mmol/L, 0.5L of 1-butene and 100 L of hydrogen converted under normal temperature and normal pressure. Then, the autoclave was heated to 23° C. Further, ethylene was charged in an amount corresponding to 0.2 MPa of gas phase pressure in the autoclave, and after stabilization in the system, 250 mmol of triisobutylaluminum, 30 mmol of racemi-ethylenebis(1-indenyl)zirconium diphenoxide, subsequently 0.20 kg of the above-mentioned co-catalyst carrier (A3) were added to initiate polymerization. The mixture was heated to 30° C. and further, while continuously feeding ethylene and hydrogen, pre-polymerization for a total time of 4 hours was carried out at 30° C. After completion of pre-polymerization, ethylene, butane, hydrogen gas and the like were purged and the remaining solid was dried under vacuum at room temperature, to obtain a catalyst component in which 58 g of ethylene and 1-butene had been pre-polymerized per g of the above-mentioned co-catalyst carrier (A3).

(3) Production of Ethylene-α-Olefin Copolymer

Using the pre-polymerization catalyst component obtained above, copolymerization of ethylene and 1-hexene was carried out in a continuous type fluidized bed gas phase polymerization apparatus to obtain ethylene-1-hexene copolymer powder.

The polymerization conditions included a temperature of 85° C., a total pressure of 2 MPa, a gas linear velocity of 0.24 m/sec, a hydrogen molar ratio to ethylene of 0.8% and a 1-hexene molar ratio to ethylene of 1.5%, and during the polymerization, ethylene, 1-hexene and hydrogen were continuously fed for maintaining the gas composition constant. The above-mentioned catalyst component and tri-isobutyl aluminum were fed continuously, so as to maintain a total powder weight in the fluidized bed of 80 kg constant. The average polymerization time was 4 hours.

To the powder of ethylene-1-hexene copolymer obtained, 1800 wt-ppm of Sumilizer GP (manufactured by Sumitomo Chemical Company, Ltd.) and 1000 wt-ppm of calcium stearate were added, the mixture obtained was granulated with an extruder (LCM 100 manufactured by Kobe Steel, Ltd.) under conditions of a feed rate of 350 kg/hour, screw rotation number of 450 rpm, gate opening of 4.2 mm, suction pressure of 0.2 MPa and resin temperature of 200 to 230° C. to obtain an ethylene-1-hexene copolymer. Evaluation results of the copolymer were shown in Table 1.

TABLE 1

| Property of Copolymer | Unit | Example 1 | Example 2 | Example 3 | Comparative Example 1 | Comparative Example 2 |
|---|---|---|---|---|---|---|
| MFR | g/10 min. | 0.48 | 0.46 | 2.20 | 2.23 | 1.01 |
| Density | Kg/m$^3$ | 912.0 | 920.4 | 921.4 | 919.6 | 920.9 |
| Ea | kJ/mol | 73 | 73 | 61 | 41 | 72 |
| Melt viscosity | Pa · sec | 1010 | 960 | 680 | 850 | 760 |
| Right side of formula(1) | | 1412 | 1432 | 823 | 818 | 1096 |
| t | sec | 6.4 | 9.1 | 2.5 | 5.9 | 6.2 |
| Right side of formula(2) | | 9.0 | 9.3 | 3.9 | 2.9 | 5.2 |
| Log A | — | 3.96 | 4.00 | 3.89 | 4.05 | 3.98 |
| Right side of formula(2) | | 3.99 | — | — | — | — |
| Right side of formula(2) | | — | 4.01 | 3.95 | 3.95 | 3.98 |
| [η] | dL/g | 1.15 | 1.15 | | 1.12 | 1.03 |
| Swell ratio | — | 1.34 | 1.29 | 1.33 | 1.35 | 1.28 |
| Mw/Mn | — | 12.6 | 8.8 | 5.3 | 3.9 | 11.4 |
| MFRR | — | 109 | 131 | 74 | 50 | 91 |
| Maximum Melting point | ° C. | 100.3 | 105.2 | 108.7 | 120.0 | 106.0 |
| Fusion component of higher than 118° C. | | Existence | Existence | Existence | Existence | Existence |
| CXS | Wt % | 5.5 | 1.9 | 0.6 | 2.1 | 3.7 |
| Right side of formula(9) | | 2.3 | 1.2 | 2.0 | 2.3 | 1.5 |
| Property of molded article | | | | | | |
| FE | Number/m$^2$ | 19 | 22 | 16 | ≧1000 | 67 |
| Haze | % | 4.2 | 7.7 | | 11.1 | — |
| Processability | | | | | | |
| Resin Pressure | MPa | 28 | 26 | 16 | 25 | 20 |
| MT | cN | 5.8 | 5.4 | 4.0 | 2.7 | 4.4 |

The invention claimed is:

1. An ethylene-α-olefin copolymer having monomer units derived from ethylene and monomer units derived from an α-olefin of 3 to 20 carbon atoms, a density of 906 to 970 kg/m³, an activation energy of flow of 50 kJ/mol or more and a molecular weight distribution defined as a ratio of weight average molecular weight to number average molecular weight of 5 or more, wherein said copolymer has a melt complex viscosity (η, unit: Pa·sec) measured at a temperature of 190° C. and angular frequency of 100 rad/second and a melt flow rate measured at 190° C. under a load of 21.18 N according to JIS K7210-1995(MFR, unit: g/10 minutes) that satisfy the following formula (1), the melt flow rate and a characteristic relaxation time (t, unit: second) that satisfy the following formula (2), the melt flow rate and a melt tension (MT, unit: cN) that satisfy the following formula (5"), and the melt flow rate and an intrinsic viscosity ([η], unit: dL/g) that satisfy the following formula (6"):

$$\eta < 1550 \times MFR^{-0.25} - 420 \quad (1)$$

$$2 < t \leq 5.2 \times MFR^{-0.746} \quad (2)$$

$$2.5 \times MFR^{-0.59} < MT < 15 \times MFR^{-0.59} \quad (5")$$

$$1.08 \times MFR^{-0.094} < [\eta] < 1.42 \times MFR^{-0.156} \quad (6").$$

2. An ethylene-α-olefin copolymer having monomer units derived from ethylene and monomer units derived from an α-olefin of 3 to 20 carbon atoms, having a density of 906 to 970 kg/m³, a molecular weight distribution defined as a ratio of weight average molecular weight to number average molecular weight of 5 or more, and an activation energy of 50 kJ/mol or more, wherein said copolymer has a melt complex viscosity (η, unit: Pa·second) measured at a temperature of 190° C. and angular frequency of 100 rad/second and a melt flow rate measured at 190° C. under a load of 21.18 N according to JIS K7210-1995 (MFR: unit; g/10 minutes) that satisfy the following formula (1), when the density is less than 915 kg/m³, a chain length of the highest molecular weight component (Å, unit: angstrom) and the melt flow rate that satisfy the following formula (3) or when the density is not less than 915 kg/m³, that satisfy the following formula (4), the melt flow rate and a melt tension (MT, unit: cN) that satisfy the following formula (5"), and the melt flow rate and an intrinsic viscosity ([η], unit: dL/g) that satisfy the following formula (6"):

$$\eta < 1550 \times MFR^{-0.25} - 420 \quad (1)$$

$$3.3 < \log A \leq -0.0815 \times \log(MFR) + 3.96 \quad (3)$$

$$3.3 < \log A \leq -0.0815 \times \log(MFR) + 3.98 \quad (4)$$

$$2.5 \times MFR^{-0.59} < MT < 15 \times MFR^{-0.59} \quad (5")$$

$$1.08 \times MFR^{-0.094} < [\eta] < 1.42 \times MFR^{-0.156} \quad (6").$$

3. The ethylene-α-olefin copolymer according to claim 1, wherein the η and MFR satisfy the following formulas (1") and (2"):

$$\eta < 1450 \times MFR^{-0.25} - 420 \quad (1")$$

$$2 < t \leq 5.0 \times MFR^{-0.746} \quad (2").$$

4. The ethylene-α-olefin copolymer according to claim 2, wherein the η, MFR and A satisfy the following formulas:

$$\eta < 1450 \times MFR^{-0.25} - 420 \quad (1"), \text{ and}$$

when the density is less than 915 kg/m³, $$3.3 < \log A \leq -0.0815 \times \log(MFR) + 3.94 \quad (3"), \text{ or}$$

when the density is not less than 915 kg/m³, $$3.3 < \log A - 0.0815 \times \log(MFR) + 3.98 \quad (4").$$

5. The ethylene-α-olefin copolymer according to any one of claims 1 to 4, wherein the copolymer satisfies the following formula (9):

$$0.1 < CXS < 10^{(30.3 - 0.0327 \times d + 0.354 \times \log MFR)} \quad (9)$$

wherein MFR is as defined above, d is the density of the copolymer as described above and CXS is a cold xylene soluble part percentage (% by weight) in the copolymer.

* * * * *